UNITED STATES PATENT OFFICE.

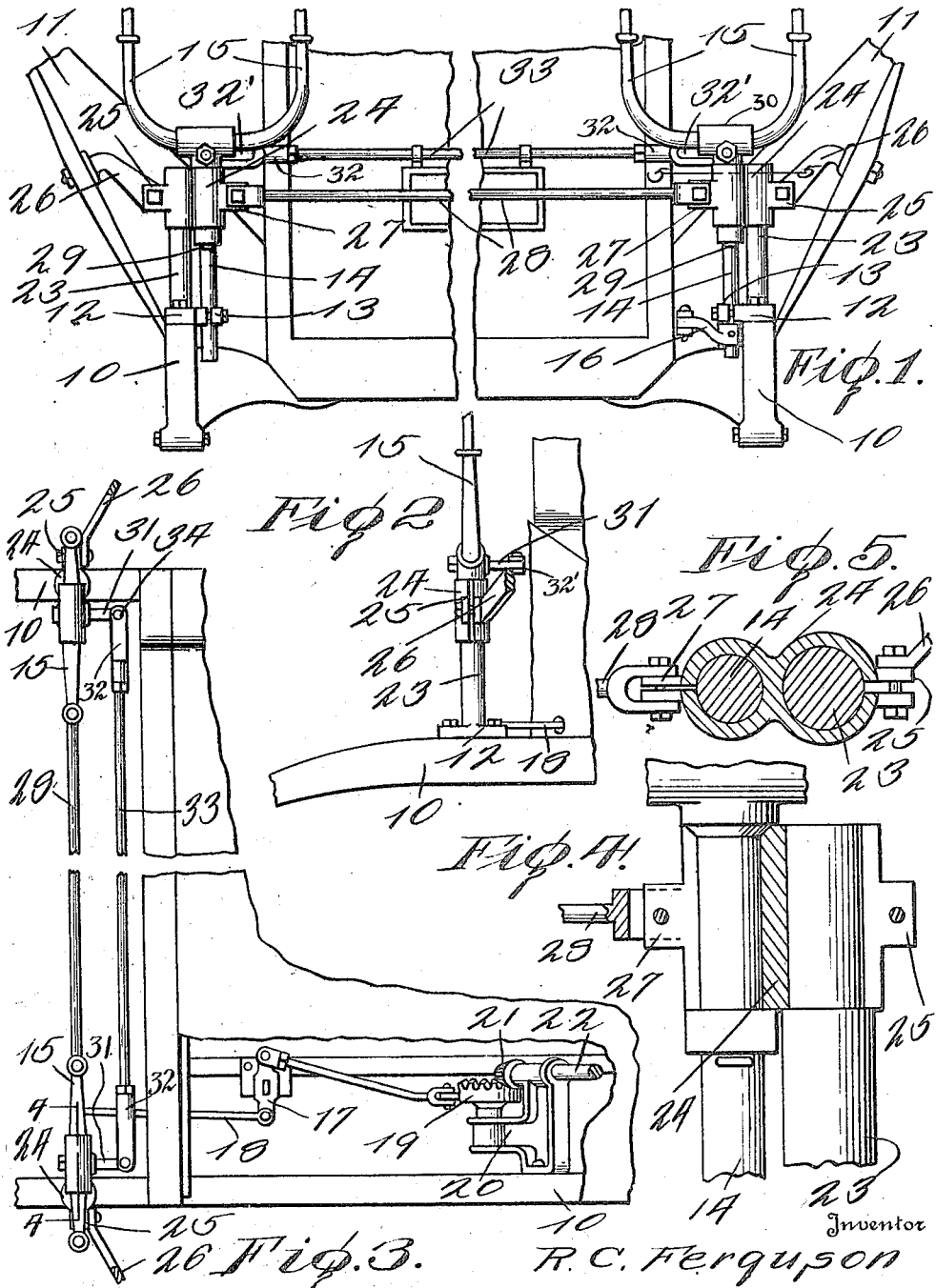

RALEY C. FERGUSON, OF GLENDIVE, MONTANA.

DIRIGIBLE HEADLIGHT FOR AUTOMOBILES.

1,229,923.   Specification of Letters Patent.   Patented June 12, 1917.

Application filed December 18, 1916. Serial No. 137,638.

*To all whom it may concern:*

Be it known that I, RALEY C. FERGUSON, a citizen of the United States, residing at Glendive, in the county of Dawson, State of Montana, have invented certain new and useful Improvements in Dirigible Headlights for Automobiles; and I do hereby declare the following to be a full, clear, and exact description of the invention, such as will enable others skilled in the art to which it appertains to make and use the same.

This invention relates to improvements in headlights for automobiles, and particularly to dirigible headlights therefor.

One object is to improve and simplify the construction of the mechanism through which the headlights are turned by the steering column of the automobile.

Another object is to provide a novel and improved means for mounting the headlights and for holding them in proper position on the automobile.

Another object is to provide a device of this character which can be readily adapted for use on different sized machines.

Other objects and advantages will be apparent from the following description when taken in connection with the accompanying drawing.

In the drawing:

Figure 1 is a front elevation of an automobile showing my improved headlights mounted thereon.

Fig. 2 is a side elevation, partly in section,

Fig. 3 is a fragmentary top plan view of the mechanism at one side of the automobile.

Fig. 4 is a sectional view taken on the line 4—4 of Fig. 3, slightly enlarged.

Fig. 5 is a horizontal sectional view taken on the line 5—5 of Fig. 1, slightly enlarged.

Referring particularly to the accompanying drawing, 10 represents the forward ends of the side members of the chassis of the automobile, and 11 the front mud guards thereof. Mounted on each of said portions of the chassis is a block 12 from the side of which extends a split bearing block 13 for the rotatable reception of the lower end of the stem 14 of the lamp supporting fork 15. The said stem extends below said bearing block and has clamped thereto a laterally extending arm 16, which arm is pivotally connected to one end of a centrally pivoted arm 17 mounted on the chassis, by means of the link 18. The other end of this arm 17 is connected to a segmental pinion 19 mounted in a bracket 20, on the chassis, adjacent the pinion 21 carried by the lower end of the steering column 22, and with which pinion the pinion 19 constantly meshes. Extending upwardly from the block 12 is a post or standard 23, and engaged on the upper end of this standard is a double tubular member 24, which has projecting from one side thereof, an apertured lug 25, to which is connected an arm 26 which is secured to the adjacent mud guard. Through the other portion of the member 24 is rotatably engaged the upper portion of the before-mentioned stem 14. The said other portion of the member 24 is provided with a lug 27 to which is connected one end of a brace rod 28, said rod extending transversely of the automobile, in front of the radiator thereof, and being similarly connected at its other end to the corresponding portion of the member 24 at the other side of the machine. It will, of course, be understood that the parts which have been described, and which will be later described in connection with the specific mounting of the lamps are duplicated on the other side of the automobile. This rod firmly holds the parts in proper spaced relation.

On the lamp stem, below the member 24 there is disposed a collar, which is adjustable vertically on the stem by means of the set screw 29.

On the upper end of each stem is a T-coupling 30 which receives the intermediate or bight portion of the fork 15 therethrough. Extending rearwardly through this coupling 30 is a bolt 31 which is pivoted in the bifurcation 32' of one of the members 32 which are adjustably secured to the ends of a connecting rod 33, said rod extending between the said stems and being adapted to cause the simultaneous movement of the stems, and the lamps, when actuated by the steering column of the automobile. By means of the bifurcated and adjustable members at the ends of the rod 33, and the bolts 31, the device can be adjusted to various widths to fit cars of different sizes.

It will thus be seen that I have provided a simple and effective device for movement of the headlights of an automobile—which are actuated when the automobile is turned by the steering wheel. The device is capable of attachment to different cars by simple adjustments.

What is claimed is:

1. The combination with the chassis and front guards of an automobile of bearing blocks mounted on the chassis, brackets carried by the guards, standards carried by the blocks, means carried by each bracket engaging with a standard, a vertical lamp stem disposed in each of the bracket carried means and supported in the said bearing block, rigid connections between the said bracket carried means, and a moving means connecting the lamp stems.

2. The combination with the chassis and front guards of an automobile, of standards mounted on the chassis at each side thereof, a lamp stem rotatably disposed in the lower portion of the standard, a double tubular member supported on each of the guards and engaging with the upper end of a standard, a rod rigidly connecting the said tubular members, connections between one of the stems and the steering column of the automobile, and a rod movably and adjustably connected to the upper portions of the stems.

In testimony whereof, I affix my signature, in the presence of two witnesses.

RALEY C. FERGUSON.

Witnesses:
 R. E. HERRICK,
 L. A. ONSUM.